April 14, 1931.  G. O. BRITTAIN  1,800,927
AIR COOLED ENGINE
Filed May 1, 1929
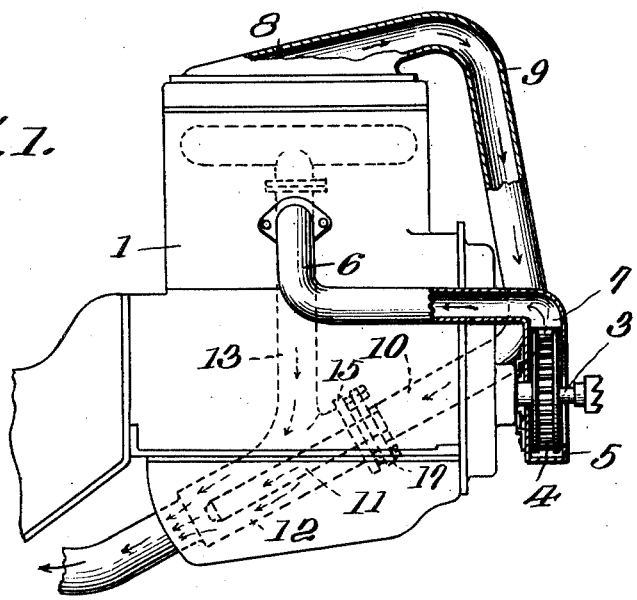
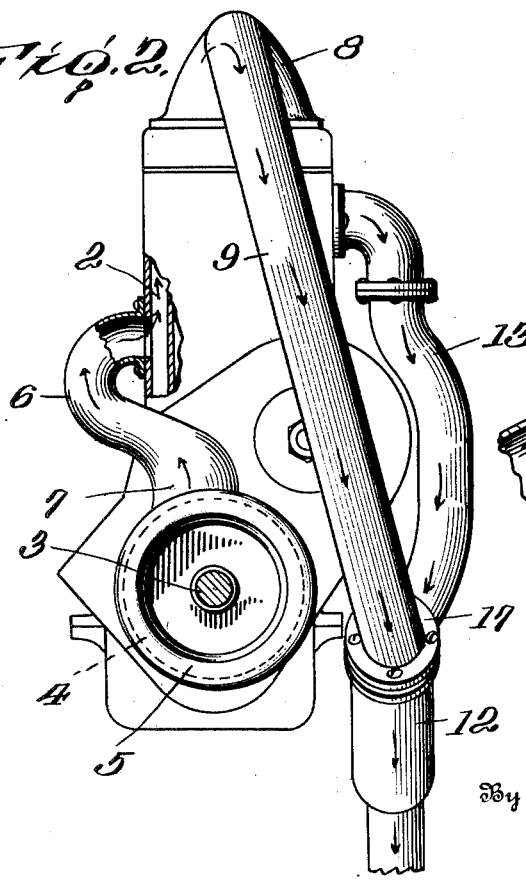
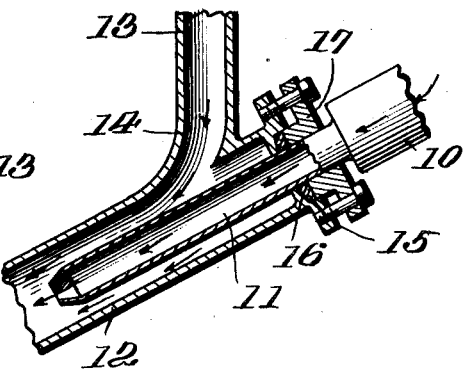
Inventor
G. O. BRITTAIN.
By
Eccleston & Eccleston,
Attorneys Patented Apr. 14, 1931

1,800,927

UNITED STATES PATENT OFFICE

GUSTAVUS O. BRITTAIN, OF CANTON, OHIO

AIR-COOLED ENGINE

Application filed May 1, 1929. Serial No. 359,701.

The present invention relates to internal combustion engines and has special reference to such types of internal combustion engines as are used on automobiles, trucks, aeroplanes and the like.

As now generally constituted, internal combustion engines are provided with a water jacket for surrounding the cylinders so as to carry off excess heat as expeditiously as possible and thereby avoid undue heating of the engine with a consequent reduction of power as well as other objectionable features. Various structures have been devised for using atmospheric air as a cooling medium for internal combustion engines, but such devices have not generally proved satisfactory either by reason of the improper circulation of the air currents or because of the complexity and prohibitive cost of the mechanisms employed.

An object of the present invention consists in employing the usual water jacket space as a means for the circulation of air about the cylinders, and thereby eliminating the radiator now in common use.

It is a further object of this invention to provide a positive forced draft of air about the cylinders by the consolidation of three forces, namely, a blower, a suction action caused by the speed of travel of the exhaust gases from the cylinders, and the natural tendency of warm air to travel from a lower to a higher level.

Other objects and advantages of the invention will be apparent from the following description when taken in connection with the accompanying drawing, in which Figure 1 is a side elevational view of an internal combustion engine with the improved cooling means attached; parts being broken away for the sake of clearness.

Figure 2 is a front elevational view of the structure shown in Figure 1, parts also being broken away to more clearly show the construction; and Figure 3 is an enlarged sectional view through the suction creating structure.

Referring to the drawing more specifically, the numeral 1 designates a conventional type of internal combustion engine provided with the usual water jacket 2 which encompasses the body of the cylinders, the cylinder heads, etc., but having the radiator usually employed in such constructions removed, as being unnecessary in view of the air cooling system about to be described.

The numeral 3 indicates the main crank shaft of the engine provided with clutch 4 by means of which the shaft may be manually rotated in starting the engine. Mounted directly on this shaft 3 is a blower 4 surrounded by a casing 5. This blower will, of course, rotate at crank-shaft speed and the current of air generated thereby is conducted through a conduit 6 to the double-wall jacket 2. The lower end 7 of this conduit is preferably enlarged where it joins the casing 5 so as to more readily collect the air currents produced by the blower 4.

The cool air entering the cylinder jacket 2 passes upwardly and around the cylinders absorbing heat from the cylinder walls. This air current is forced upwardly partly by pressure from the blower and partly because of the natural tendency of hot air to ascend. As the relatively hot air reaches the top of the engine it is collected in a hood 8 which completely covers the top of the engine and terminates in a pipe 9. The pipe or conduit 9 leads downwardly from the hood 8 and is then directed rearwardly as indicated at 10.

The end of the pipe section 10 is preferably reduced in diameter as indicated by numeral 11 and is mounted in a pipe 12 of substantially larger diameter. This pipe 12 constitutes the main exhaust pipe of the engine and communicates with the exhaust ports of the engine through the medium of the connection 13. Pipe 13 is united to the pipe 12 by a rounded joint as indicated by numeral 14, and its point of communication with pipe 12 is substantially midway of the length of the reduced portion 11 of conduit 10. It will thus be apparent that the discharge of the exhaust gases past the end of pipe 11 will create a suction effect on the interior of the pipe. By this means it will be observed that a third force is applied to the air in the jacket 2 to enhance its circulation about the cylinder walls. Furthermore, the projection of the current of air into the exhaust gases serves not only to dilute the gases and lessen their poisonous effect but also to break up the gases and thus produce a muffler effect.

In order to insure a gas tight connection between the pipe 11 and pipe 12 and thereby insure a high degree of suction force in pipe 11, I provide a packing gland 15 on the pipe 12 within which is received suitable packing material 16 and an expanding member 17 clamped in position in the usual manner.

In the operation of the device a strong current of cool air passes into the blower casing 5 as the automobile moves in a forward direction. This current of air is given an added impetus by the blower 4 as the air is forced into the jacket 2. Passage of the air upwardly about the hot cylinder walls is augmented by the natural tendency of the air to rise as it absorbs heat from the walls, and this circulation is further improved by the suction force created by the passage of exhaust gases past the mouth of the pipe 11 which forms an extension of the pipe 9—10 leading from the hood 8.

From the foregoing description and the attached drawing it will be apparent to those skilled in the art that I have devised a simple and inexpensive construction of air cooled motor in which forced circulation of cooling air about the cylinder walls is provided by the cumulative effect of three separate and distinct forces, namely, a blower, convection currents, and the suction force created in pipe 10—11 by reason of the passage of the exhaust gases past the end of the pipe. It will also be apparent that the entire cooling system is free from cams, gearing, or like moving parts, with the single exception of a rotary blower which is mounted directly on the engine crank-shaft.

In accordance with the patent statutes I have described what I now believe to be the preferred embodiment of the invention but various changes in details of construction may be made without departing from the spirit of the invention, and I therefore intend to include such minor changes within the scope of the appended claims.

Having fully described my invention, what I claim as new and desire to secure by Letters Patent is:

1. An internal combustion engine having one or more cylinders, an exhaust conduit leading from the explosion chamber of said cylinders, each cylinder being formed of spaced walls providing a passage for a cooling medium, a hood enveloping the top of the engine and communicating with said passages, a pipe associated with said hood and terminating in said exhaust conduit, whereby a suction force is created in said pipe, a blower, and a pipe leading from the blower to the lower ends of said passages.

2. An internal combustion engine having one or more cylinders, each cylinder being formed of spaced walls providing a passage for a cooling medium, a blower mounted on the front end of the engine crank-shaft, a casing for said blower, a pipe associated with said casing and having its opposite end in communication with the lower ends of said cylinder passages, a hood enveloping the top of the engine and communicating with said passages, and means associated with said hood for creating a suction force in said passages.

G. O. BRITTAIN.